(12) United States Patent
Nazarpoor et al.

(10) Patent No.: US 8,845,987 B1
(45) Date of Patent: Sep. 30, 2014

(54) METHOD FOR IMPROVING LEAN PERFORMANCE OF PGM CATALYST SYSTEMS: SYNERGIZED PGM

(71) Applicants: Zahra Nazarpoor, Camarillo, CA (US); Stephen J. Golden, Santa Barbara, CA (US)

(72) Inventors: Zahra Nazarpoor, Camarillo, CA (US); Stephen J. Golden, Santa Barbara, CA (US)

(73) Assignee: Clean Diesel Technologies Inc. (CDTI), Ventura, CA (US)

(*) Notice: Subject to any disclaimer, the term of this patent is extended or adjusted under 35 U.S.C. 154(b) by 0 days.

(21) Appl. No.: 14/090,915

(22) Filed: Nov. 26, 2013

(51) Int. Cl.
*B01D 53/56* (2006.01)
*B01D 53/62* (2006.01)
*B01D 53/72* (2006.01)
*B01D 53/94* (2006.01)

(52) U.S. Cl.
CPC ............ *B01D 53/945* (2013.01); *B01D 53/62* (2013.01); *B01D 53/72* (2013.01); *B01D 53/565* (2013.01)
USPC .................. 423/213.2; 423/213.5; 423/239.1; 423/245.3; 423/247; 60/274; 60/299; 60/301

(58) Field of Classification Search
USPC ............ 423/213.2, 213.5, 239.1, 245.3, 247; 60/274, 299, 301
See application file for complete search history.

(56) References Cited

U.S. PATENT DOCUMENTS

2010/0062293 A1* 3/2010 Triantafyllopoulos et al. . 429/17

* cited by examiner

*Primary Examiner* — Timothy Vanoy
(74) *Attorney, Agent, or Firm* — Barnes & Thornburg LLP; Thomas J. McWilliams; Edward F. Behm, Jr.

(57) ABSTRACT

Synergized Platinum Group Metals (SPGM) catalyst system for TWC application is disclosed. Disclosed SPGM catalyst system may include a washcoat with a Cu—Mn spinel structure and an overcoat that includes PGM supported on carrier material oxides, such as alumina. SPGM catalyst system shows significant improvement in nitrogen oxide reduction performance under stoichiometric operating conditions and especially under lean operating conditions, which allows a reduced consumption of fuel. Additionally, disclosed SPGM catalyst system also enhances the reduction of carbon monoxide and hydrocarbon within catalytic converters. Furthermore, disclosed SPGM catalyst systems are found to have enhanced catalyst activity compared to commercial PGM catalyst system, showing that there is a synergistic effect among PGM catalyst and Cu—Mn spinel within the disclosed SPGM catalyst system.

15 Claims, 6 Drawing Sheets

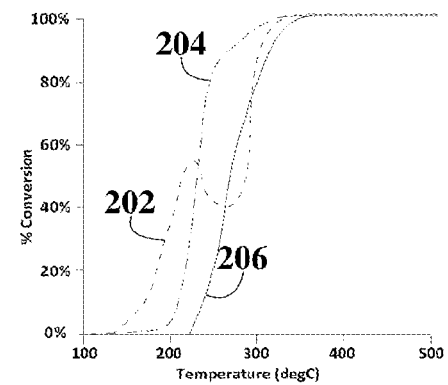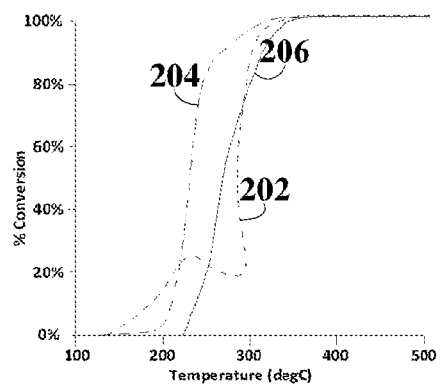
FIG. 2A  FIG. 2B
FIG. 2

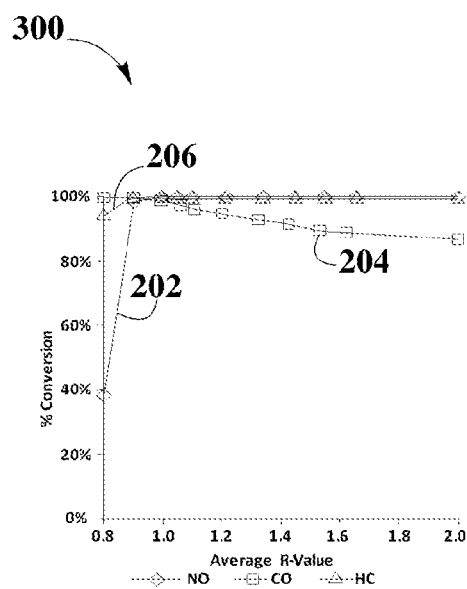
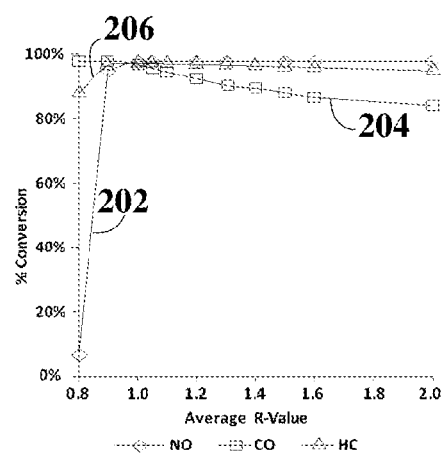
FIG. 3A      FIG. 3B
FIG. 3

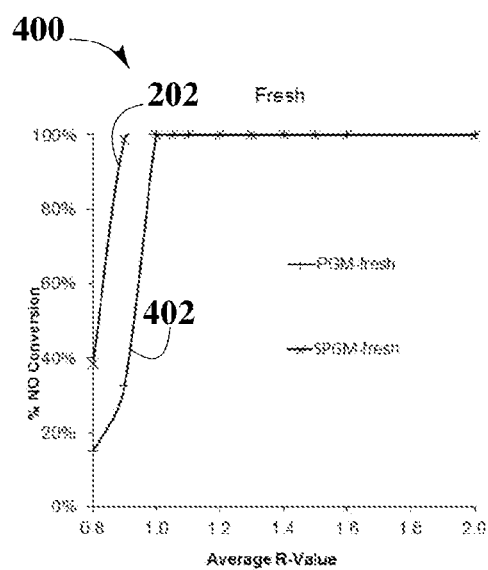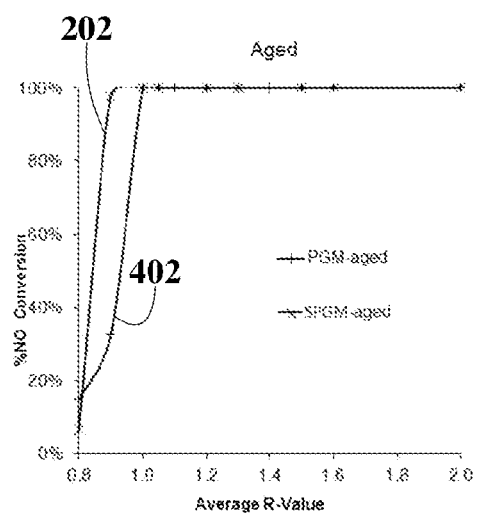
FIG. 4A  FIG. 4B
FIG. 4

METHOD FOR IMPROVING LEAN PERFORMANCE OF PGM CATALYST SYSTEMS: SYNERGIZED PGM

CROSS-REFERENCE TO RELATED APPLICATIONS

The present disclosure is related to U.S. patent application Ser. No. 14/090,861, entitled "System and Methods for Using Synergized PGM as a Three-Way Catalyst", and U.S. patent application Ser. No. 14/090,887, entitled "Oxygen Storage Capacity and Thermal Stability of Synergized PGM Catalyst System", as well as U.S. patent application entitled "Systems and Methods for Managing a Synergistic Relationship between PGM and Copper-Manganese in a Three Way Catalyst Systems", all filed Nov. 26, 2013, the entireties of which are incorporated by reference as if fully set forth herein.

BACKGROUND

1. Technical Field

The present disclosure relates generally to PGM catalyst systems, and, more particularly, to synergized PGM catalyst systems with lean performance improvement.

2. Background Information

Catalysts in catalytic converters have been used to decrease the pollution caused by exhaust from various sources, such as automobiles, utility plants, processing and manufacturing plants, airplanes, trains, all-terrain vehicles, boats, mining equipment, and other engine-equipped machines. Important pollutants in the exhaust gas of internal combustion engines may include carbon monoxide (CO), unburned hydrocarbons (HC), nitrogen oxides (NOx), and particulate matter (PM). Several oxidation and reduction reactions take place in the catalytic converter, which is capable of removing the major pollutants HC, CO and $NO_x$ simultaneously, therefore, it is called a three-way catalyst.

Catalytic converters are generally fabricated using at least some platinum group metals (PGM). With the ever stricter standards for acceptable emissions, the demand on PGM continues to increase due to their efficiency in removing pollutants from exhaust. However, this demand, along with other demands for PGM, places a strain on the supply of PGM, which in turn drives up the cost of PGM and therefore catalysts and catalytic converters. Additionally, engines associated with TWC using PGM operate at or near stoichiometric conditions.

Catalytic materials used in TWC applications have also changed, and the new materials have to be thermally stable under the fluctuating exhaust gas conditions. The attainment of the requirements regarding the techniques to monitor the degree of the catalyst's deterioration/deactivation demands highly active and thermally stable catalysts in which fewer constituents may be provided to reduce manufacturing costs, offer additional economic alternatives, and maintain high performance materials with optimal thermal stability and enhanced performance due to its facile nature of the redox function of the used chemical components.

For the foregoing reasons, there is a need for combined catalyst systems that include low amounts of PGM catalysts, which may have facile nature of the redox function of the used chemical components, and which may exhibit optimal synergistic behavior yielding enhanced activity and performance especially under lean condition in order to allow fuel economy.

SUMMARY

The present disclosure provides Synergized Platinum Group Metals (SPGM) catalyst systems which may exhibit high catalyst activity, especially under lean condition, and thus enhanced NO, CO and HC conversion.

According to an embodiment, SPGM catalyst system may include at least a substrate, a washcoat, and an overcoat, where substrate may include a ceramic material, washcoat may include a Cu—Mn spinel structure, $Cu_{1.0}Mn_{2.0}O_4$, supported on $Nb_2O_5$—$ZrO_2$, and overcoat may include PGM catalyst such as Palladium (Pd) supported on carrier material oxides, such as alumina.

Disclosed SPGM catalyst system may be prepared using suitable known in the art synthesis method, such as co-milling process, and co-precipitation process, among others.

According to one aspect of the present disclosure, fresh and aged samples of disclosed SPGM catalyst system may be prepared in order to determine hydrothermal stability and catalyst activity of the SPGM catalyst system.

Catalyst activity and thermal stability in fresh and hydrothermally aged (900° C.) samples of disclosed SPGM catalyst system may be determined by performing steady state light off tests, steady state sweep tests, and isothermal steady state test under stoichiometric conditions and lean conditions, and compared to results of commercial PGM catalyst systems that include palladium, and rhodium.

SPGM catalyst system of the present disclosure show surprisingly significant improvement in nitrogen oxide conversion under stoichiometric operating conditions and especially under lean operating conditions which may allow reduced consumption of fuel. Additionally, disclosed SPGM catalyst system also enhances the reduction of carbon monoxide and hydrocarbon within catalytic converters.

Numerous other aspects, features and benefits of the present disclosure may be made apparent from the following detailed description taken together with the drawing figures.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 2 illustrates steady state light-off test results for fresh and aged samples of SPGM catalyst systems under TWC gas condition, at an R-value of 1.05 and SV of 40,000 $h^{-1}$, according to an embodiment.

FIG. 3 shows steady test sweep test results for samples of fresh SPGM and aged SPGM catalyst system, under SV of 40,000 $h^{-1}$ and an inlet temperature of 450° C., to determine R-value at NO/CO cross over, according to an embodiment.

FIG. 4 shows steady state sweep test results for fresh and aged samples of both SPGM and commercial PGM catalyst system under SV of 40,000 $h^{-1}$ and an inlet temperature of 450° C., to compare R-value at NO/CO cross over, according to an embodiment.

DETAILED DESCRIPTION

Figure 1:
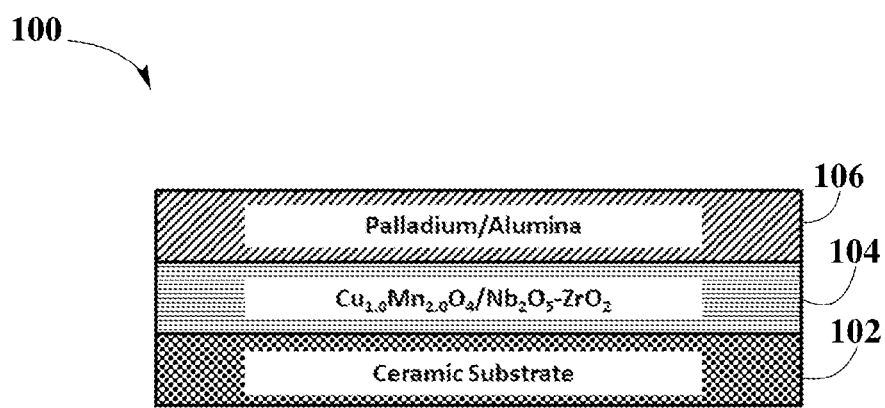
FIG. 1 depicts configuration for SPGM catalyst systems, according to an embodiment.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

DEFINITIONS

As used here, the following terms may have the following definitions:

"Catalyst system" refers to a system of at least two layers including at least one substrate, a washcoat, and/or an overcoat.

"Substrate" refers to any material of any shape or configuration that yields a sufficient surface area for depositing a washcoat and/or overcoat.

"Washcoat" refers to at least one coating including at least one oxide solid that may be deposited on a substrate.

"Overcoat" refers to at least one coating that may be deposited on at least one washcoat layer.

"Catalyst" refers to one or more materials that may be of use in the conversion of one or more other materials.

"Milling" refers to the operation of breaking a solid material into a desired grain or particle size.

"Co-precipitation" refers to the carrying down by a precipitate of substances normally soluble under the conditions employed.

"Calcination" refers to a thermal treatment process applied to solid materials, in presence of air, to bring about a thermal decomposition, phase transition, or removal of a volatile fraction at temperatures below the melting point of the solid materials.

"Platinum group metals (PGM)" refers to platinum, palladium, ruthenium, iridium, osmium, and rhodium.

"Synergized platinum group metal (SPGM) catalyst" refers to a PGM catalyst system which is synergized by a non-PGM group metal compound under different configuration.

"Oxygen storage material (OSM)" refers to a material able to take up oxygen from oxygen rich streams and able to release oxygen to oxygen deficient streams.

"Treating," "treated," or "treatment" refers to drying, firing, heating, evaporating, calcining, or mixtures thereof.

"Three-Way Catalyst" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

"R-Value" refers to the number obtained by dividing the reducing potential by the oxidizing potential.

"Lean condition" refers to exhaust gas condition with an R-value below 1.

"Stoichiometric condition" refers to the condition when the oxygen of the combustion gas or air added equals the amount for completely combusting the fuel.

"$T_{50}$" may refer to the temperature at which 50% of a material is converted.

"Conversion" refers to the chemical alteration of at least one material into one or more other materials.

DESCRIPTION OF THE DRAWINGS

The present disclosure may generally provide a synergized PGM (SPGM) catalyst system having enhanced catalytic performance especially under lean condition, incorporating more active components into phase materials possessing three-way catalyst (TWC) properties.

According to embodiments in the present disclosure, SPGM catalyst systems may be configured with a washcoat layer including Cu—Mn spinel with Niobium-Zirconia support oxide, an overcoat layer including a PGM catalyst of palladium (Pd) with alumina-based support, and suitable ceramic substrate.

Catalyst System Configuration

FIG. 1 depicts configuration for SPGM catalyst system 100. As shown in FIG. 1, SPGM catalyst system 100 may include at least a substrate 102, a washcoat 104, and an overcoat 106, where washcoat 104 may include a Cu—Mn spinel structure, $Cu_{1.0}Mn_{2.0}O_4$, supported on $Nb_2O_5$—$ZrO_2$ and overcoat 106 may include PGM catalyst, such as Palladium (Pd) supported on carrier material oxides, such as alumina.

In an embodiment, substrate 102 materials may include a refractive material, a ceramic material, a honeycomb structure, a metallic material, a ceramic foam, a metallic foam, a reticulated foam, or suitable combinations, where substrate 102 may have a plurality of channels with suitable porosity. Porosity may vary according to the particular properties of substrate 102 materials. Additionally, the number of channels may vary depending upon substrate 102 used as is known in the art. The type and shape of a suitable substrate 102 would be apparent to one of ordinary skill in the art. According to the present disclosure, preferred substrate 102 materials may be ceramic material.

According to an embodiment, washcoat 104 may include a Cu—Mn stoichiometric spinel, $Cu_{1.0}Mn_{2.0}O_4$, as metal catalyst. Additionally, washcoat 104 may include support oxide, such as $Nb_2O_5$—$ZrO_2$.

According to embodiments of the present disclosure, overcoat 106 may include aluminum oxide, doped aluminum oxide, spinel, delafossite, lyonsite, garnet, perovksite, pyrochlore, doped ceria, fluorite, zirconium oxide, doped zirconia, titanium oxide, tin oxide, silicon dioxide, zeolite, and mixtures thereof. According to the present disclosure, most suitable material for disclosed overcoat 106 may be alumina ($Al_2O_3$). Additionally, overcoat 106 may include a PGM catalyst, such as Palladium (Pd), Platinum (Pt), and Rhodium (Rh). According to the present disclosure, most suitable PGM for disclosed overcoat 106 may be Pd.

Preparation of SPGM Catalyst System

An SPGM catalyst system 100 including a ceramic substrate 102, a washcoat 104, and an overcoat 106 may be prepared.

The preparation of washcoat 104 may begin by co-milling $Nb_2O_5$—$ZrO_2$ support oxide to make aqueous slurry. The $Nb_2O_5$—$ZrO_2$ support oxide may have $Nb_2O_5$ loadings of about 15% to about 30% by weight, preferably about 25% and $ZrO_2$ loadings of about 70% to about 85% by weight, preferably about 75%.

The Cu—Mn solution may be prepared by mixing an appropriate amount of Mn nitrate solution ($MnNO_3$) and Cu nitrate solution ($CuNO_3$), where the suitable copper loadings may include loadings in a range of about 10% by weight to about 15% by weight. Suitable manganese loadings may include loadings in a range of about 15% by weight to about 25% by weight. The next step is precipitation of Cu—Mn nitrate solution on $Nb_2O_5$—$ZrO_2$ support oxide aqueous slurry, which may have a suitable base solution added thereto, such as to adjust the pH of the slurry to a suitable range. The precipitated Cu—Mn/$Nb_2O_5$—$ZrO_2$ slurry may be aged for a period of time of about 12 to 24 hours under continued stirring at room temperature.

Subsequently, the precipitated slurry may be coated on substrate 102, using a cordierite material with honeycomb structure, where substrate 102 may have a plurality of channels with suitable porosity. The aqueous slurry of Cu—Mn/Nb$_2$O$_5$—ZrO$_2$ may be deposited on the suitable ceramic substrate 102 to form washcoat 104, employing vacuum dosing and coating systems. In the present disclosure, a plurality of capacities of washcoat 104 loadings may be coated on the suitable ceramic substrate 102. The plurality of washcoat 104 loading may vary from about 60 g/L to about 200 g/L, in the present disclosure particularly about 120 g/L. Subsequently, after deposition on ceramic substrate 102 of the suitable loadings of Cu—Mn/Nb$_2$O$_5$—ZrO$_2$ slurry, washcoat 104 may be dried overnight at about 120° C. and subsequently calcined at a suitable temperature within a range of about 550° C. to about 650° C., preferably at about 600° C. for about 5 hours. Treatment of washcoat 104 may be enabled employing suitable drying and heating processes. A commercially-available air knife drying systems may be employed for drying washcoat 104. Heat treatments (calcination) may be performed using commercially-available firing (furnace) systems.

A suitable washcoat 104 deposited on substrate 102 may have a chemical composition with a total loading of about 120 g/L, including a Cu—Mn spinel structure with copper loading of about 10 g/L to about 15 g/L and manganese loading of about 20 g/L to about 25 g/L.

Overcoat 106 may include a combination of Pd on alumina-based support. The preparation of overcoat 106 may begin by milling the alumina-based support oxide separately to make an aqueous slurry. Subsequently, a solution of Pd nitrate may then be mixed with the aqueous slurry of alumina with a loading within a range from about 0.5 g/ft$^3$ to about 10 g/ft$^3$. In the present embodiment, Pd loading is about 6 g/ft$^3$ and total loading of washcoat material is 120 g/L. After mixing of Pd and alumina slurry, Pd may be locked down with an appropriate amount of one or more base solutions, such as sodium hydroxide (NaOH) solution, sodium carbonate (Na$_2$CO$_3$) solution, ammonium hydroxide (NH$_4$OH) solution, and tetraethyl ammonium hydroxide (TEAH) solution, among others. In the present embodiment, Pd may be locked down using a base solution of tetraethyl ammonium hydroxide (TEAH). No pH adjustment is required. Then, the resulting slurry may be aged from about 12 hours to about 24 hours for subsequent coating as overcoat 106 on washcoat 104, dried and fired at about 550° C. for about 4 hours.

Catalyst activity of disclosed SPGM catalyst system 100 may be determined and compared with catalyst activity of commercial PGM catalyst system 100 that includes palladium (Pd) and rhodium (Rh); in amounts of about 6 g/ft$^3$ of Pd, and 6 g/ft$^3$ of Rh, using loading of about 60% by weight. The OSM within commercial PGM catalyst system 100 may include several rare metals, mostly CeO$_2$, with loading of about 30% by weight to about 40% by weight.

Steady State Light-off Test for SPGM Catalyst Systems

FIG. 2 illustrates steady state light-off test 200, which was performed at stoichiometric condition (R-value of 1.05). Steady state light-off test 200 has been performed employing a test reactor with space velocity of about 40,000 hr$^{-1}$, at temperature range of 100° C. to about 500° C., increasing with a rate of about 40 C/min with gas composition in feed stream of 8,000 ppm of CO, 400 ppm of C$_3$H$_6$, 100 ppm of C$_3$H$_8$, 1,000 ppm of NO$_R$, 2,000 ppm of H$_2$, 10% of CO$_2$, 10% of H$_2$O, and 0.7% of O$_2$.

Steady state light-off test 200 shows the performance in NO, CO, and HC conversion of fresh and aged samples of disclosed SPGM catalyst system 100 with procedures previously described. Aged samples of SPGM catalyst system 100 have been prepared by hydrothermal aging with 10% steam at about 900° C. for about 4 hours.

To facilitate comparison, NO conversion curve 202 has been designated with dash lines, CO conversion curve 204 has been designated with dot and dash lines, and HC conversion curve 206 has been designated with a solid line.

As may be seen in FIG. 2A, for fresh samples of SPGM catalyst system 100, T50 of NO occurs at temperature of about 211.9° C., where the NO conversion reaches to 50%. T50 of CO occurs at temperature of about 228.1° C., where the CO conversion reaches to 50%. T50 of HC occurs at temperature of about 265.9° C., where the HC conversion reaches to 50%.

Moreover, as may be observed in FIG. 2B, for aged samples of SPGM catalyst system 100, T50 of NO occurs at temperature of about 313.8° C., where the NO conversion reaches to 50%. T50 of CO occurs at temperature of about 241.3° C., where the CO conversion reaches to 50%. T50 of HC occurs at temperature of about 282.0° C., where the HC conversion reaches to 50%.

According to principles of the present disclosure, disclosed SPGM catalyst system 100 demonstrated good catalytic activity in TWC condition compared under stoichiometric condition for both fresh and aged samples of disclosed SPGM catalyst system 100.

According to an embodiment, a steady state sweep test may be performed on fresh samples of disclosed SPGM catalyst system 100 and thermally aged (900° C.) samples of disclosed SPGM catalyst system 100 to determine NO and CO cross over, and therefore select the R-value where highest conversion of NO and CO meets together.

Isothermal Steady State Sweep Test Procedure

The isothermal steady state sweep test may be carried out employing a flow reactor in which the inlet temperature may be increased to about 450° C., and testing a gas stream at 11-point R-values from about 2.0 (rich condition) to about 0.80 (lean condition) to measure the CO, NO, and HC conversions.

The space velocity (SV) in the flow reactor may be adjusted at about 40,000 h$^{-1}$. The gas feed employed for the test may be a standard TWC gas composition, with variable O$_2$ concentration in order to adjust R-value from rich condition to lean condition during testing. The standard TWC gas composition may include about 8,000 ppm of CO, about 400 ppm of C$_3$H$_6$, about 100 ppm of C$_3$H$_8$, about 1,000 ppm of NO$_R$, about 2,000 ppm of H$_2$, 10% of CO$_2$, and 10% of H$_2$O. The quantity of O$_2$ in the gas mix may be varied to adjust Air/Fuel (A/F) ratio and to represent the three-way condition of the control loop.

FIG. 3 shows isothermal steady state sweep test results 300 for fresh and aged samples of disclosed SPGM catalyst system 100 where fresh and aged samples of SPGM catalyst system 100 were tested, under SV of 40,000 h$^{-1}$ and an inlet temperature of 450° C., in order to determine R-value at NO/CO cross over. Aged samples of disclosed SPGM catalyst system 100 were aged at 900° C. for about 4 hrs.

As may be seen in FIG. 3A, NO conversion curve 202, CO conversion curve 204, and HC conversion curve 206, show that the NO/CO cross over for fresh samples of SPGM catalyst system 100 takes place at the specific R-value of about 0.950, thus, demonstrating that NO, and CO conversion at lean condition (R-value of about 0.950) is 99.9%. At the same R-value the HC conversion is also 99.9%. Moreover, in FIG. 3B, NO conversion curve 202, CO conversion curve 204, and HC conversion curve 206, show that the NO/CO cross over for aged samples of SPGM catalyst system 100 takes place at the specific R-value of about 0.965, thus, demonstrating that NO, and CO conversion at lean condition (R-value of about 0.965) is about 99.7%. At the same R-value the HC conversion is also 99.8%.

Isothermal steady state sweep test results 300 for fresh samples of disclosed SPGM catalyst system 100 and aged samples of disclosed SPGM catalyst system 100 show that SPGM catalyst is very active at lean condition closer to stoichiometric. The similar NO, CO, and HC conversion of disclosed SPGM catalyst after aging demonstrates thermal stability of this catalyst.

FIG. 4 shows isothermal steady state sweep test results 400 for fresh and aged samples of both SPGM and commercial PGM catalyst system 100 under SV of 40,000 $h^{-1}$ and an inlet temperature of 450° C., to compare NO conversion, according to an embodiment.

FIG. 4A shows isothermal steady state sweep test results 400, where disclosed SPGM catalyst system 100 may be tested in comparison with commercial PGM catalyst system 100. Both catalyst systems 100 are fresh. Commercial PGM catalyst system 100 includes 6 g/ft³ palladium (Pd) and 6 g/ft³ rhodium (Rh).

In FIG. 4A, SPGM NO conversion curve 202, and PGM NO conversion curve 402 may be observed. As shown in FIG. 4A, NO conversion for fresh SPGM catalyst system 100 is higher than PGM catalyst system 100 at lean region (R-value <1.00), demonstrating that fresh SPGM catalyst system 100 exhibits higher performance under lean conditions. For example, at R-value=0.88, the disclosed SPGM catalyst system 100 shows NO conversion of about 90%, however, the PGM catalyst system 100 shows NO conversion of only 28% at the same R-value. The Disclosed SPGM catalyst system 100 and PGM catalyst system 100 show similar NO conversion of 100% at stoichiometric condition (R-value=1.00) and under rich condition (R-value>1.00). These results show improvement of lean performance in SPGM catalyst systems 100. Synergistic effect between Pd and Cu—Mn spinel is responsible for such improvement.

FIG. 4B shows isothermal steady state sweep test results 400 for aged samples of disclosed SPGM catalyst system 100 and for aged samples of commercial PGM catalyst system 100, where samples of SPGM catalyst system 100 and samples of commercial PGM catalyst system 100 were hydrothermally (10% steam) aged at 900° C. for about 4 hrs. In FIG. 4B, SPGM NO conversion curve 202, and PGM NO conversion curve 402 may be observed. As shown in FIG. 4B, NO conversion for aged SPGM catalyst system 100 is higher than PGM catalyst system 100 at lean region (R-value <1.00), demonstrating that aged SPGM catalyst system 100 exhibits higher performance under lean conditions. For example, at R-value=0.88, the disclosed SPGM catalyst system 100 shows NO conversion of about 85%, however, the PGM catalyst system 100 shows NO conversion of only 26% at the same R-value. The disclosed SPGM catalyst system 100 and PGM catalyst system 100 show similar NO conversion of 100% at stoichiometric condition (R-value=1.00) and under rich condition (R-value>1.00). These results show improvement of lean performance in SPGM catalyst system 100 even after aging. Synergistic effect between Pd and Cu—Mn spinel is responsible for such improvement.

Isothermal Steady State Test under Stoichiometric Conditions

According to an embodiment, the isothermal steady state sweep test was performed employing a test reactor at temperature of about 450° C. Steady state isothermal test. Steady state isothermal test was conducted under stoichiometric conditions (R-value of 1.00), at a space velocity (SV) of 40,000 $h^{-1}$, and during a length of time of about 60 minutes (3600 sec).

The simulated exhaust was a standard TWC gas composition that may include 8,000 ppm of CO, 400 ppm of $C_3H_6$, 100 ppm of $C_3H_8$, 1000 ppm of $NO_x$, 2000 ppm of $H_2$, 10% of $CO_2$, 10% of $H_2O$, and a quantity of $O_2$ in the gas mix to adjust Air/Fuel (A/F) ratio at stoichiometric condition.

Figure 5:
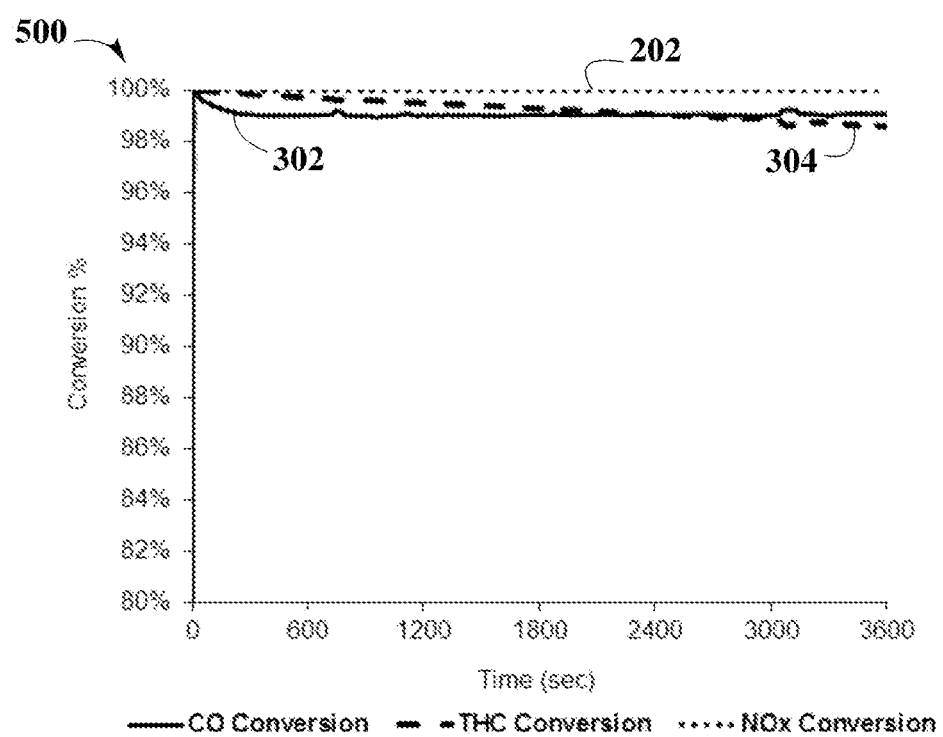
FIG. 5 shows steady state isothermal test results for SPGM catalyst system, under SV of 40,000 $h^{-1}$, at an R-value of 1.0, and an inlet temperature of 450° C. to determine average CO, NO, and HC conversions, according to an embodiment.

FIG. 5 shows isothermal steady state isothermal test results 500 for fresh samples of disclosed SPGM catalyst system 100. In FIG. 5, SPGM NO conversion curve 202, SPGM CO conversion curve 302, and SPGM conversion HC curve 304 may be observed. As shown in FIG. 5, disclosed SPGM catalyst system 100 exhibits high conversion capacities, in which, in length of time of about 60 minutes, and under stoichiometric TWC conditions previously described, 100% of NO was converted, 99.1% of CO was converted and 98.6% of HC was converted. Thus, disclosed SPGM catalyst system 100 is positively affected by the synergistic activity between its components palladium and Cu—Mn spinel, $Cu_{1.0}Mn_{2.0}O_4$. In addition, the NO, CO and HC conversion during test stream (1 hour duration) maintain unchanged which shows the stability of disclosed SPGM catalyst system 100, this results shows high level NO conversion of SPGM catalyst system 100 under lean condition is not affected by oxygen storage capacity of SPGM catalyst system 100 (no degradation is observed), and the stable SPGM catalyst system 100 can be obtained by synergistic effect of PGM and Cu—Mn spinel.

Isothermal Steady State Test under Lean Conditions

According to an embodiment, the steady state isothermal test was performed employing a test reactor at temperature of about 450° C. Isothermal steady state test was conducted under lean condition (R-value of 0.95), at a space velocity (SV) of 40,000 $h^{-1}$, and during a length of time of about 60 minutes (3600 sec).

The simulated exhaust was a standard TWC gas composition that may include 8,000 ppm of CO, 400 ppm of $C_3H_6$, 100 ppm of $C_3H_8$, 1000 ppm of $NO_R$, 2000 ppm of $H_2$, 10% of $CO_2$, 10% of $H_2O$, and a quantity of $O_2$ in the gas mix to adjust Air/Fuel (A/F) ratio at lean condition.

Figure 6:
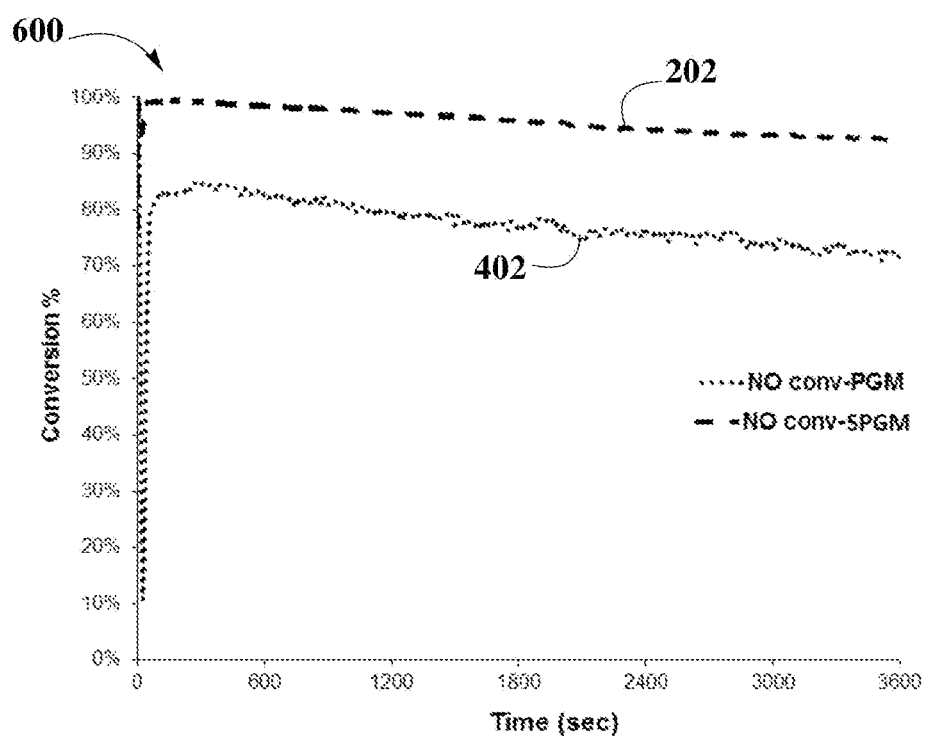
FIG. 6 depicts steady state isothermal test results for NO conversion, where disclosed SPGM catalyst system may be tested in comparison with commercial PGM catalyst system, under SV of 40,000 $h^{-1}$, at an R-value of 0.95, and an inlet temperature of 450° C. according to an embodiment.

FIG. 6 depicts isothermal steady state isothermal test results 600 for NO conversion, where disclosed SPGM catalyst system 100 may be tested in comparison with commercial PGM catalyst system 100. Both catalyst systems 100 are fresh. Commercial PGM catalyst system 100 includes 6 g/ft³ palladium (Pd), and 6 g/ft³ rhodium (Rh) as PGM.

In FIG. 6, SPGM NO conversion curve 202, and commercial PGM NO conversion curve 402 may be observed. As shown in FIG. 6, disclosed SPGM catalyst system 100 exhibits high NO conversion, in which the average NO conversion at the last 3 minutes is about 92.5%. Moreover, average NO conversion at the last 3 minutes for commercial PGM is about 72.2% of NO. The comparison of CO conversion (not shown here) shows the disclosed SPGM catalyst system 100 and commercial PGM catalyst system have average conversion of 99.9% for the last 3 minutes. Additionally, the comparison of HC conversion (not shown here) shows the disclosed SPGM catalyst system 100 has an average conversion of 99.9% while the commercial PGM catalyst system 100 has average conversion of 95.5% for the last 3 minutes.

As may be observed in performance comparison between SPGM catalyst system 100 and PGM catalyst system 100, shown in FIG. 6, there is a significant improved performance in NO conversion under lean conditions (R-value of 0.95) for disclosed SPGM catalyst system 100. This improved performance is the result of the synergistic effect between the PGM component (palladium) and the ZPGM components (Cu—Mn stoichiometric spinel) in the respective compositions of disclosed SPGM catalyst system 100, in which adding of ZPGM components is responsible for the improved performance of NO conversion when compared with the level of NO conversion of the PGM catalyst shown in PGM NO conversion curve 402. In addition, SPGM catalyst system 100 shows better stability than PGM catalyst system 100 and exhibits high level NO conversion under lean condition. Since high performance under lean operating conditions allows less fuel consumption, then vehicles may employ disclosed SPGM catalyst system 100 to achieve better fuel economy.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A method for optimizing a catalytic system, comprising:
   providing a catalyst system into at least one stream of lean combustion exhaust, comprising:
   a substrate;
   a washcoat suitable for deposition on the substrate, comprising at least one oxygen storage material further comprising Cu—Mn spinel having a niobium-zirconia support oxide; and
   an overcoat suitable for deposition on the substrate, comprising at least one platinum group metal catalyst and at least one carrier support oxide; and
   converting at least one of NO, CO and HC through oxidation or reduction.

2. The method of claim 1, wherein the at least one carrier support oxide is $Al_2O_3$.

3. The method of claim 1, wherein the converting of NO is less than about 90%.

4. The method of claim 3, wherein the exhaust has an R value of about 0.88.

5. The method of claim 1, wherein the catalyst system is aged.

6. The method of claim 5, wherein the converting of NO is greater than about 80% and less than about 90%.

7. The method of claim 6, wherein the exhaust has an R value of about 0.88.

8. The method of claim 1, wherein the converting of NO is greater than about 95%.

9. The method of claim 8, wherein the exhaust has an R value of about 0.95.

10. A method for optimizing a catalytic system, comprising:
    providing a catalyst system into at least one stream of lean combustion exhaust produced by an engine, comprising:
    a substrate;
    a washcoat suitable for deposition on the substrate, comprising at least one oxygen storage material further comprising Cu—Mn spinel having a niobium-zirconia support oxide; and
    an overcoat suitable for deposition on the substrate, comprising at least one platinum group metal catalyst and at least one carrier support oxide; and
    converting at least one of NO, CO and HC through oxidation or reduction;
    wherein the Cu—Mn spinel is stoichiometric.

11. The method of claim 10, wherein the converting of NO is greater than about 98%.

12. The method of claim 10, wherein the converting of CO is greater than about 98%.

13. The method of claim 10, wherein the converting of HC is greater than about 98%.

14. The method of claim 10, wherein the stability of the catalyst system is improved by the addition of Cu—Mn spinel.

15. The method of claim 10, wherein fuel consumption of the engine is reduced.

* * * * *